US012735840B2

(12) United States Patent
Steiner et al.

(10) Patent No.: US 12,735,840 B2
(45) Date of Patent: Sep. 15, 2026

(54) METHOD FOR PRODUCING A TRANSFER MIXTURE BY THE DIRECT DISSOLUTION PROCESS, USING A THIN LAYER EVAPORATOR

(71) Applicant: List Technology AG, Arisdorf (CH)

(72) Inventors: Manuel Steiner, Basel (CH); Roland Kunkel, Frankfurt a.M. (DE); Daniel Witte, Grenzach-Wyhlen (DE); Judith Andrea Michelle Günther, Lörrach (DE)

(73) Assignee: List Technology AG, Arisdorf (CH)

( * ) Notice: Subject to any disclaimer, the term of this patent is extended or adjusted under 35 U.S.C. 154(b) by 248 days.

(21) Appl. No.: 18/272,196

(22) PCT Filed: Jan. 12, 2022

(86) PCT No.: PCT/EP2022/050477

§ 371 (c)(1),
(2) Date: Jul. 13, 2023

(87) PCT Pub. No.: WO2022/152713

PCT Pub. Date: Jul. 21, 2022

(65) Prior Publication Data

US 2024/0301623 A1 Sep. 12, 2024

(30) Foreign Application Priority Data

Jan. 13, 2021 (DE) .................... 10 2021 100 484.5

(51) Int. Cl.
*D21C 9/18* (2006.01)
*B01D 1/22* (2006.01)

(52) U.S. Cl.
CPC .............. *D21C 9/18* (2013.01); *B01D 1/223* (2013.01)

(58) Field of Classification Search
CPC .................................................... C08B 1/003
See application file for complete search history.

(56) References Cited

U.S. PATENT DOCUMENTS 4,196,282 A 4/1980 Franks et al.
4,416,698 A * 11/1983 McCorsley, III ........ C08J 3/096 536/56

(Continued)

FOREIGN PATENT DOCUMENTS

CH 674472 A5 6/1990
DE 4118884 A1 12/1992

(Continued)

OTHER PUBLICATIONS

Office Action dated Aug. 10, 2023, issued in corresponding application KZ 2023/0526.1.

(Continued)

*Primary Examiner* — Alison L Hindenlang
*Assistant Examiner* — Debjani Roy
(74) *Attorney, Agent, or Firm* — Bachman & LaPointe, P.C.

(57) ABSTRACT

A method for producing a transfer mixture by the direct dissolution method in a thin film evaporator (D) having a feed, a housing and a discharge, wherein the feed introduces a product consisting essentially of cellulose, water and a functional liquid into the housing, wherein an evaporator shaft (5) situated in the housing (4) rotationally wipes the product over the heated interior of the housing (4), wherein the product heats up and some of the water evaporates, so that the transfer mixture is obtained, wherein (a) the transfer mixture is discharged before the product substantially overheats; and (b) all heating surfaces of the thin film evaporator (Continued)

in contact with the product are subjected to a heating temperature, which is at least 20K above the temperature of the product.

8 Claims, 1 Drawing Sheet

(56) References Cited

U.S. PATENT DOCUMENTS

| | | | | |
|---|---|---|---|---|
| 4,824,257 | A | 4/1989 | List et al. | |
| 2021/0178383 | A1 * | 6/2021 | Wiley | B01L 3/502 |
| 2022/0410094 | A1 * | 12/2022 | Zhu | B29B 7/72 |
| 2024/0075403 | A1 * | 3/2024 | Steiner | D01D 1/02 |

FOREIGN PATENT DOCUMENTS

| | | | | |
|---|---|---|---|---|
| DE | 4441468 | C2 | 2/2000 | |
| DE | 19940521 | A1 | 4/2001 | |
| DE | 102012103296 | A1 | 10/2013 | |
| EP | 0225314 | B1 * | 10/1991 | B01D 1/223 |
| WO | 9406530 | A1 | 3/1994 | |
| WO | 9633302 | A1 | 10/1996 | |
| WO | 9711973 | A1 | 4/1997 | |
| WO | 2008086550 | A1 | 7/2008 | |
| WO | 2008154668 | A1 | 12/2008 | |
| WO | 2013156489 | A1 | 10/2013 | |
| WO | 2020249705 | A1 | 12/2020 | |

OTHER PUBLICATIONS

International Search Report and Written Opinion Dated May 11, 2022 for corresponding application PCT/EP2022/050477.

Diener A et al. “Continuous Dissolution Process of Cellulose in NMMO” Chemical Fibers International, vol. 49, No. 1, Mar. 1, 1999, pp. 40-42 ISSN: 0340-3343, XP000827372.

Uzbekistan Office Action Dated Feb. 7, 2024 issued in corresponding application No. UZ IAP 2023 0447.

German Office Action Dated Oct. 10, 2023 issued in corresponding application No. 10 2021 100 484.5.

Office Action dated Apr. 14, 2025, issued in corresponding application KZ 2023/0526.1.

* cited by examiner

Fig. 1
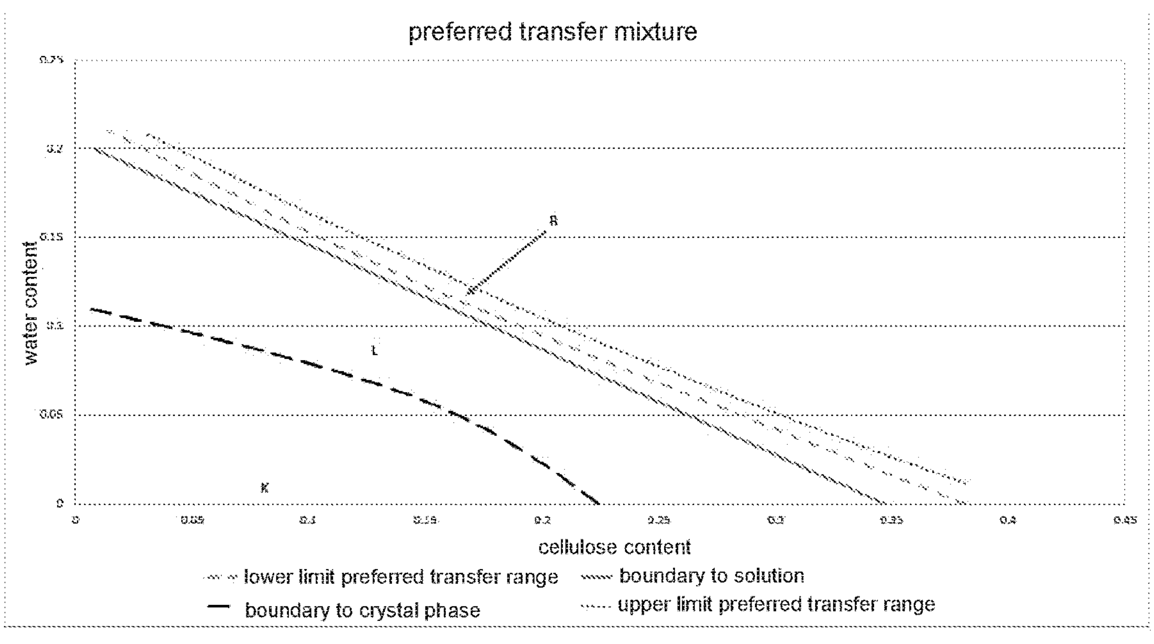
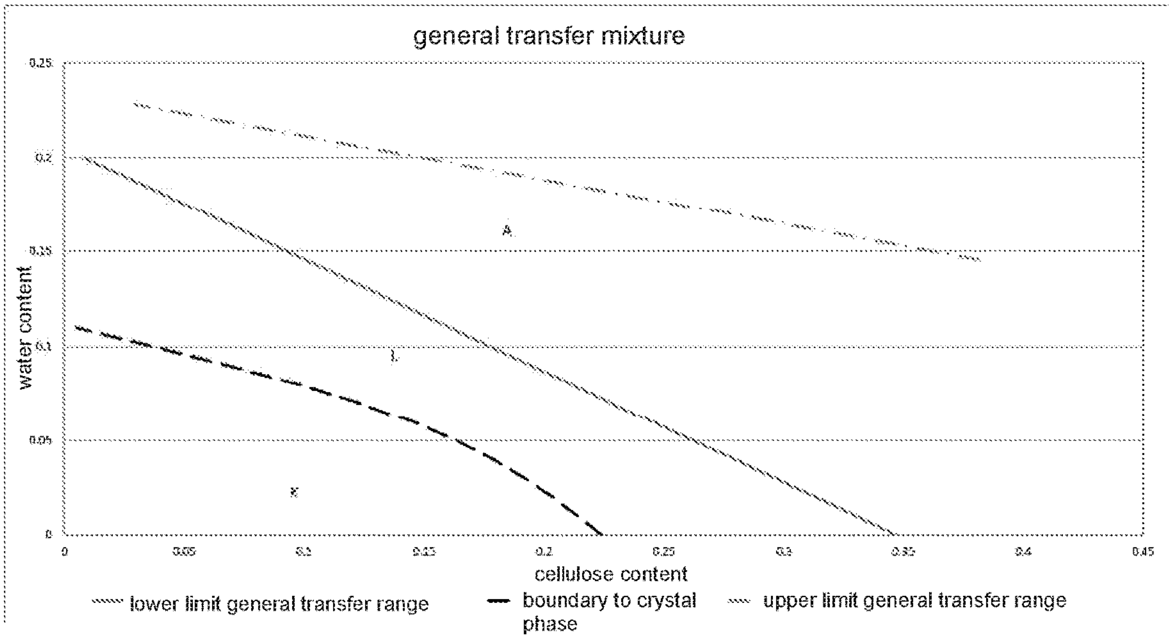
Fig. 2

METHOD FOR PRODUCING A TRANSFER MIXTURE BY THE DIRECT DISSOLUTION PROCESS, USING A THIN LAYER EVAPORATOR

BACKGROUND OF THE INVENTION

The invention relates to a method for producing a transfer mixture according to the direct dissolution method.

The method for producing a molding solution from cellulose by the direct dissolution method on an industrial scale by evaporation of water from a cellulose-water-functional liquid mixture (hereinafter also referred to as product and cellulose, functional liquid and water as product components) is described, for example, in WO 1994/006530 A1, wherein N-Methylmorpholine-N-Oxide (hereinafter also referred to as NMMO or amine oxide) is used as the functional liquid (commonly known as the Lyocell molding solution method or amine oxide method). By cellulose-water-functional liquid mixture or product is meant all water contents or substance mixture states, i.e., from a large water content at which a suspension is present to a water content so small that a molding solution is present, and thus includes the transfer mixture.

It describes the use of thin film evaporators for the evaporation of water from a cellulose-NMMO-water mixture, which is now widely used for the lyocell form solution process, and which are now known and in common use in a variety of forms and designs, and which are all characterized in that an evaporator shaft in the housing of the thin film evaporator distributes the product on an inner housing surface serving as a heating surface, so that a thin film is formed which may additionally be turbulent with increasing rotational speed and decreasing viscosity, so that the product is heated rapidly and some of the water evaporates. By heating surface, both above and hereinafter, is meant any heated surface which is intended to thermally introduce energy into a product via a temperature difference between the heating surface and the product. However, this method discloses the production of a molding solution, wherein hereinafter the solution is referred to as a molding solution as defined in DE 10 2012 103 296 A1.

While thin film evaporators are usually designed with a vertical orientation of the evaporator shaft as described for example in WO 1994/006530 A1, they can also be designed with a horizontal orientation of the evaporator shaft, as described for example in WO 2020/249705 A1.

The skilled person is additionally familiar with the method for producing a molding solution from cellulose by the direct dissolution method, in which an ionic liquid (hereinafter referred to as IL) is used instead of NMMO as the functional liquid, but otherwise a molding solution is also produced by a direct dissolution method by using a thin film evaporator to evaporate water from a cellulose-IL-water mixture.

IL or ionic liquids herein refers to a group of organic compounds which, despite their ionic structure, have a low melting point (<100° C.) and are therefore also referred to as molten salts. The use of IL as a functional liquid therefore always means an embodiment within the group of ionic liquids that is suitable for the direct dissolution method.

It is known to the skilled person that some ILs tend to thermal decomposition at elevated temperatures, so that processes with a heated IL must keep the temperature of the IL below its decomposition temperature. As an example, the decomposition of the IL [DBNH][OAc] above temperatures of about 100° C. may be mentioned. It is also known to the skilled person that with the reduction of the water content of a NMMO-water mixture at elevated temperatures, decomposition of the NMMO begins. At temperatures typically above 140° C., there is an increasing risk of explosion with reduction of the water content, for example through explosive autocatalytic decomposition, from which a further increase in temperature and thus acute risk of explosion follows. Depending on the composition of the mixture, decomposition can also be observed from temperatures above 125° C., since the decomposition temperature can be reduced by, for example, the presence of reducing agents (such as cellulose) and heavy metal ions (such as iron ions). In the case of the direct dissolution method described above, a reduction in the decomposition temperature can be expected due to the presence of cellulose in the process and the use of ferrous materials for the machine construction, despite the usual addition of stabilizers.

The skilled person is also aware of the fact, referred to in the context of the invention as the problem of substantial overheating, that in order to avoid decomposition of the functional liquid, great attention must be paid to the control of the temperature of the product (hereinafter also referred to as product temperature). Therefore, it chooses a process in which the desired temperature of the product as well as its equilibrium temperature is below the decomposition temperature.

In a multi-component mixture, as in the case of the cellulose-functional liquid-water mixture, each composition of the mixture is assigned an equilibrium temperature at prevailing process conditions (pressure) at which the mixture begins to boil. If energy is added to the system, some of the volatile components (in this case water) evaporate. At the same time, the composition of the mixture changes, as a result of which the equilibrium temperature also changes. Thus, the mixture heats up when energy is supplied, while its composition changes along its equilibrium curve due to evaporation of volatile components. As the water content decreases, the viscosity increases due to increasing cellulose concentration and the increasing dissolving power of the functional liquid or the functional liquid-water mixture. With increasing viscosity, the evaporating water in the product increasingly develops the risk of transport limitation, so that evaporative cooling can no longer take place to a sufficient extent and consequently the temperature of the water-functional liquid mixture and of the product increases to values above the equilibrium temperature. The equilibrium temperature of the mixture changes with its composition and with the process pressure. Thus, even without transport limiting effects, the temperature of the mixture increases over the course of the process, so that decomposition can occur even at equilibrium temperature if the process parameters are chosen appropriately. The skilled person therefore selects process parameters where the equilibrium temperatures that occur are always below the decomposition temperatures. For NMMO as a functional liquid, equilibrium temperatures in the area of 50° C. to 110° C. usually result as an example over the course of the process.

In the case of NMMO as a functional liquid, exothermic decomposition processes also lead to local material overheating (hotspots), from which the heat of reaction cannot be dissipated to a sufficient extent, if transport is limited. This subsequently triggers further exothermic decomposition processes.

Significant overheating causes the functional liquid, the cellulose or the cellulose-functional liquid-water mixture to heat up to such high temperatures at which their decomposition takes place. Overheating that results in temperatures of the product or a product component above decomposition temperatures specific to the product or product component respectively, shall be referred to hereinafter as with substantial overheating. Thereby it is irrelevant whether the overheating results from a lack of evaporative cooling due to transport limitation or is caused by overdrying of the product at equilibrium.

The decomposition of the functional liquid is described above. On the one hand, it causes the need to replace the lost-usually very expensive-functional liquid and, on the other hand, acutely increases the risk of explosion with NMMO as functional liquid.

However, substantial overheating may also involve decomposition of the cellulose or the cellulose-functional liquid-water mixture (or, by definition, of the product) by leading to a reduction in the degree of polymerization (known to the skilled person as DP) of the cellulose at excessively high temperatures, possibly in conjunction with increased shearing-which typically prevails at elevated viscosities. Thus, substantial overheating of the product can have a product-damaging or safety-hazardous effect by decomposing some of the product or the product itself.

Of course, a process control at temperatures below the decomposition temperature can also have a damaging or safety-endangering effect on the product due to non-thermally induced decomposition processes (e.g. radical reactions). In practice, however, this is counteracted by common stabilizers.

Furthermore, temperature control aiming at equilibrium temperatures above the decomposition temperatures would also lead to product damage and safety hazards. In practice, the skilled person does not aim for such a mode of operation.

Nevertheless, when using a thin film evaporator for the direct dissolution method, special attention must be paid to temperature control due to its apparatus-specific properties. On the one hand, a characteristically high heat input with a small amount of product present in the apparatus leads to efficient evaporation of volatile components. On the other hand, process fluctuations that occur (e.g. mixture flow rate, energy input or product viscosity) can only be compensated to a limited extent due to the small amount of product in the apparatus. Thus, a slight reduction of the supplied mixture flow rate can already lead to a significant increase in the product temperature. This involves the risk of a temperature increase into areas above the decomposition temperature.

Also disclosed in the WO 2008/154668 A1 is a thin film evaporator for the production of a lyocell molding solution, wherein the conveying elements on the evaporator shaft of the thin film evaporator are steeply angled for a rapid vertical product transport. Although this allows to reduce the risk of decomposition due to substantial overheating even at high heating temperatures and vacuum, as required for high manufacturing capacities and process efficiency, this is compensated by the higher heating temperatures required for the higher heat flux density necessary to compensate for the shorter residence time.

At the end, the thin film evaporator merges into an end-situated screw that feeds a pump that pumps the molding solution through piping to a molding device such as spinnerets. On the one hand, this has the advantage that the molding solution can be accumulated upstream of the pump, which is necessary for the operation of many pressure-building discharge devices to enable the thin film evaporator to operate under vacuum.

It is clear to the skilled person that, on the other hand, the stowing of the product is also essential in order to guarantee the dissolution time required for the dissolution process, since dissolution processes do not take place instantaneously but within a period of time at a dissolving speed. It is known to the skilled person that dissolving speeds are influenced by various factors such as temperature. In the case of the direct dissolution method described, it is also known to the skilled person that, in addition to temperature, the concentration of the functional liquid and the mechanical load on the mixture also have an influence on the dissolution rate. Thus, for the same composition and the same temperature, different dissolution states can occur as a result of different mechanical treatment of the material for the same treatment time.

Another reason for the above-described stowing of the product in the thin film evaporator prior to the discharge is therefore the mechanical action on the product necessary in addition to the water evaporation for the production of a molding solution, which is achieved by the specifically selected geometry of the evaporator shaft of the thin film evaporator which is ensured by the stowing of the product, which must take place over a certain period of time.

In the event of an unscheduled stop of the pump, whether as a result of an interruption of the entire production plant containing, among other things, the process due to a technical malfunction of one of the numerous process organs following the process, or whether as a result of a malfunction of the components used in the process itself, the molding solution accumulating in front of the pump can quickly overheat due to its high viscosity as a result of mechanical energy input from the evaporator shaft, which represents an acute risk of product damage and, in the case of NMMO, in particular an explosion risk. If the rotation of the evaporator shaft is stopped, the product distributed as a thin film in close contact with the heated inner housing surfaces can quickly overheat, which is also an acute product damage and, in particular, explosion risk. The heated housing surfaces are referred to as heating surfaces in the context of the invention.

The skilled person is also aware of the limited size of large industrial thin film evaporators, whose maximum heating surface is typically about 50 $m^2$.

The skilled person is also aware of the disadvantage that, in order to avoid significant overheating of the product or the functional liquid, the temperature of the heating surface (also referred to as the heating temperature or heating surface temperature) in the thin film evaporator is greatly reduced on the discharge side. Due to the higher product viscosities present there, there is also a higher energy input through dissipation compared to the upper area of the thin film evaporator. In addition, the transport speed of the product is reduced by the accumulation effect in front of the discharge, which increases the time available for product heating, which not only increases the energy input by dissipation but also the thermal energy input.

In order to avoid significant overheating of the product, it is therefore necessary to lower the heating temperature relative to the upper area. The temperature of the heating surface is typically lowered to such an extent that it corresponds approximately to the temperature of the molding solution (hereinafter also referred to as the molding solution temperature) as it exits out of the thin film evaporator, i.e., in the case of NMMO as the functional liquid at typically 100 to 105° C., in order to merely temper the product. Depending on the water content in the starting material, the discharge-side zone with reduced heating temperature typically affects 20% to 50% of the heating surface of the thin film evaporator. Conversely, avoiding this reduction in heating temperature would mean an increase in the area of the thin film evaporator used for thermal energy input by 25% to 100%, the latter would therefore mean a doubling.

The purpose of reducing the heating surface temperature is to compensate in particular for this mechanical energy input, in order to avoid significant overheating of the product or product components and the associated risks of product damage and decomposition.

Reducing the temperature of the heating surface to avoid significant overheating has the disadvantage for all functional liquids, NMMO or an IL, that not all of the available heating surface can be used for thermal energy input, which, given limited sizes of thin film evaporators, means that this heating temperature reduction, reduces the maximum production capacity of a production line, which is of competitive importance in a cost-sensitive industry that competes, among other things, on economies of scale.

Another disadvantage is increasing energy costs due to the above-mentioned throttling of thermal energy input in favor of mechanical energy input, since instead of typically inexpensive thermal energy input via the heating surface, a typically expensive electromechanical energy input occurs via energy dissipation of the rotating evaporator shaft of the thin film evaporator.

The reduction of the heating temperature can even lead to a removal of heat from the product in the discharge side area of the thin film evaporator, which means a loss of heat and further increases the energy costs.

In the case of NMMO as a functional liquid, the explosion hazard is common to all the above methods for preparing a molding solution by evaporating water from a cellulose-NMMO-water mixture.

WO 96/33302 A now discloses a plant for the production of cellulosic films, fibers and other molded articles by the amine oxide process (i.e. with NMMO as the functional liquid). Preferably, two mixing devices with two different pulpers are used thereby. With the aid of these mixing devices, the pulp is first to be defibered or ground, wherein a pump pumps a first suspension of pulp in an aqueous amine oxide solution with a dry pulp density of not more than 10% by mass of dry pulp into a device (hereinafter referred to as device 1), wherein the device reduces the amount of water present until the suspension is converted into a concentrated pulp suspension, wherein from device 1 the concentrated pulp suspension is transferred to a further device (hereinafter referred to as device 2), wherein the concentrated pulp suspension produced is converted into a formable solution of cellulose.

Both devices can herein be designed as thin film evaporators. The reason for this two-stage evaporation is the high water content in the pulp-water-NMMO mixture caused by the process control upstream of device 1. Therefore, the aim of the present invention is to pre-concentrate the pulp suspension to reduce the amount of water to be evaporated by device 2. The state of the product after device 1 is disclosed to be a concentrated pulp suspension, which means that the dissolving process has not yet started and consequently no dissolved cellulosic components are contained.

However, a discharge pump is provided between device 1 and device 2, in front of which a build-up of the concentrated pulp suspension in the form of a liquid accumulation is disclosed at this point, again increasing the risk of explosion due to the risk of material accumulation.

The WO 2013/156489 A1 also discloses two successive devices for evaporating water, wherein the first is a thin film evaporator and the second is a thick film evaporator, preferably a kneading reactor as described in the DE 199 40 521 A1, wherein in the following the kneading reactor is referred to as a mixing kneader. Thanks to good high-viscosity mixing properties and effective mechanical energy input via its shaft (hereinafter referred to as kneader shaft), the speed of which can be quickly adjusted and also quickly reduced again, the mixing kneader can control the temperature with great accuracy and reliably and, as a rule, avoid cooling of the product or heat dissipation. The thin film evaporator and the mixer-kneader are directly connected to each other by a connection, but the WO 2013/156489 A1 is silent about the explicit embodiment of the connection.

The water content in the NMMO of the concentrated pulp suspension is divided into three sections during the dissolution process. After the first section, the pulp suspension is discharged from the thin film evaporator and fed into the mixing kneader. The first section shows no viscosity increase and ends with the beginning of the dissolution window, which corresponds to a 2.5 hydrate, which corresponds to an NMMO-water concentration (NMMO related to NMMO and water in mass fractions) of approx. 72.2 wt % and where—as in the WO 06/33302 A—a low explosion tendency is to be expected due to the high water content present. The second section consists of the main dissolution process, so that there the viscosity begins to increase strongly, and the associated necessary evaporation of water until about a 1.5 hydrate is formed, which corresponds to an NMMO-water concentration of about 81.3 wt %. In the third section, homogenization takes place and water evaporates until a 0.8 to 1.0 hydrate (monohydrate) is formed, which corresponds to an NMMO water concentration of approx. 89.1 wt % to 86.7 wt %, respectively.

The disadvantage of this method is still the high water content, which is not evaporated by a thin film evaporator, which corresponds to an unused process efficiency enhancing potential of the thin film evaporator. Moreover, in the case of a cellulose-water-NMMO mixture in which the NMMO water part is still present as 2.5 hydrate, a subsequent mixing kneader—as described in the WO 2013/156489 A1—still has to evaporate a large amount of water in the input zone.

In order to achieve economical sizes of the mixing kneader, this has the consequence that, in addition to the mechanical energy input by kneading action, a non-negligible portion of the energy to be input must be provided by contact heat. Consequently, it is necessary to maximize the heating surface, at least in the input zone, which means that the discs attached to the kneader shaft, as described in more detail below, to which the mixing bars are attached, must also be designed in such a way that they can be heated. On the one hand, this heating increases the costs in design and manufacture as well as the manufacturing time of the mixing kneaders and, on the other hand, leads to higher structural weights of the kneader shaft. The integrated heating system also lowers the mechanical stability of the design and consequently causes a reduction in the maximum sizes of the mixing kneaders. The necessity of this design is further reinforced by the low viscosity of the concentrated pulp suspension when entering the mixing kneader with a NMMO water concentration of about 72.2 wt %, since this results in insufficient torque and speed in the input zone of the subsequent mixing kneader to already ensure sufficient water evaporation through the resulting friction and heating of the pulp suspension. In summary, therefore, the high water content means on the one hand high evaporation load for the mixing kneader and, on the other hand, a low mechanical energy input due to low viscosity.

Mixing kneaders are known to the skilled person. They preferably have exactly one or exactly two kneader shafts which serve to carry out highly viscous and encrusting processes, which can be operated under vacuum, atmospheric or overpressure and which can be heated or cooled via thermal exchange surfaces. In addition, the kneader shaft and its shaft structures can heat the product very effectively through rotation and friction at typical product viscosities.

If there is exactly one kneader shaft, a single-shaft mixing kneader is in front of the housing, which is described for example in the CH 674 472 A5. In this case, the shaft structures of the kneader shaft preferably mesh during operation with static structures of the housing, for example so-called counter hooks. If there are exactly two kneader shafts, a two-shaft mixing kneader is present, which is described, for example, in the DE 41 18 884 A1. The shaft structures of the kneader shafts preferably mesh with each other during operation.

The at least one kneader shaft comprises shaft structures in the form of disks and bars attached thereto, wherein the shaft structures of the at least one kneader shaft are arranged to mesh during operation with the shaft structures of a second kneader shaft or with stationary counter elements present in the mixing kneader. Mixing kneaders with such meshing elements are known and are referred to as "self-cleaning" because the described meshing removes any buildup from the meshing elements.

The kneader shafts with discs and bars described above are known from the prior art, for example from the DE 41 18 884 A1. For the present invention, it is irrelevant in which way the bars are attached to the discs and these in turn to the kneader shafts. Bars and discs (also called "supports") can, for example, also be manufactured in one piece, the term "fastened" is thus to be interpreted broadly. While the aforementioned DE 41 18 884 A1 shows a twin-shaft mixing kneader, the CH 674 472 A5 shows a single-shaft mixing kneader with hook-like static kneading counter elements (so-called "kneading counter hooks") on the inner wall of the housing. The housing, kneader shaft(s), shaft structures and static kneading counter elements can be designed as described in the above-mentioned publications.

The inner sides of the mixer-kneader housing, the kneader shaft(s) and the discs cannot be exclusively configured as thermal exchange surfaces. In the case of the mixing kneader housing, thermal exchange surfaces are typically designed as welded-on half tubes or preferably as double walls. In the case of the kneader shafts, thermal exchange surfaces mean that the kneader shaft is designed as a hollow shaft and preferably has an inflow and a return flow of the heat transfer medium or cooling medium, for example with an inner tube.

Discs with thermal exchange surfaces have cavities or bores for electrical heating elements or a heat transfer medium or cooling medium, wherein the latter have an inflow fed by the inflow in the kneader shaft and an outflow flowing back to the return flow in the kneader shaft. The cavities can typically take the form of double walls or bores and, for this purpose, require greater wall thicknesses and larger dimensions of the shaft superstructures and wall-thicker kneader shafts and, in this respect, cause a significantly greater manufacturing costs in comparison with cavity-free (hereinafter also referred to as heating cavity-free) discs, which can typically be built smaller due to the elimination of thermal exchange surfaces.

SUMMARY OF THE INVENTION

The object of the present invention is to overcome the disadvantages of the prior art.

In particular, it is intended to describe a method for producing the transfer mixture by evaporation of water from a cellulose-water-functional liquid mixture, which in the first place makes it possible to significantly increase the evaporation performance of a device suitable for evaporation, preferably a thin film evaporator, achieved by thermal energy input, without risk of overheating or explosion.

The features disclosed herein lead to the solution of the object.

Advantageous embodiments are also described herein and in the dependent claims.

The object of the present invention is the production of a transfer mixture as a first process stage of an at least two-stage process according to the direct dissolution method in a thin film evaporator, which takes into account all the facts mentioned in the context of the object.

The method according to the invention for producing the transfer mixture within the direct dissolution method proceeds in a device, preferably a thin film evaporator, having a feed, a housing and a discharge, wherein the feed comprises a product in the form of a starting material essentially of cellulose, water and a functional liquid into the housing, wherein the starting material is heated and some of the water evaporates to form the transfer mixture, wherein the transfer mixture flows to the discharge with a supply stream, and is then transferred without delay to a subsequent process organ.

In this method, a transfer mixture and not a molding solution is to be produced. The transfer mixture is thereby characterized by a water content at which the temperature of the heating surface of the thin film evaporator—in particular towards the discharge—is not substantially lowered compared to the feed without a substantial overheating of the product. The transfer mixture differs from the molding solution in that it corresponds to the product in a state before it is transferred to a moldable, in particular moldable or spinnable solution. A formable or spinnable solution is present when all the essential cellulosic constituents of the starting material have dissolved. In this context, substantial means such a low proportion of undissolved components that the so-called filter lives reach an economically acceptable level. A filter life refers to filters that are typically used after the process stage for producing the molding solution and before the process stage for shaping or spinning. The filter life corresponds to the length of time or useful life until a filter must be replaced because the pressure drop across the filter becomes too high, which increases due to the accumulation of components that are undesirable for further processing. These components can be, for example, undissolved cellulosic fibers as well as non-cellulosic impurities. The specific choice of a filter service life is therefore subject to overall economic cost and quality optimization aspects.

The transfer mixture further differs from the starting material in that some of the cellulose present in the starting material is already in solution in the transfer mixture as a result of thermo-mechanical treatment in the thin film evaporator.

The method for producing the transfer mixture according to the invention has the advantage that the product in the thin film evaporator always has a sufficiently high water content and thus a significant overheating and, in the case of NMMO as the functional liquid, a resulting risk of explosion is prevented and thus the heating temperature towards the discharge side of the thin film evaporator does not have to be lowered or not substantially lowered, but that there is always a temperature difference necessary for a thermal energy input, i.e. the difference between heating temperature and product temperature, of at least 20K, preferably 50K and ideally 70K, while avoiding substantial overheating. Another advantage is that this results in a lower mechanical load on the evaporator shaft of the thin film evaporator due to lower viscosity and avoidance of accumulation of the product on the discharge side of the thin film evaporator in front of the discharge, so that the thin film evaporator can be realized at a lower cost. This increases the maximum amount of water evaporated per heating surface of thin film evaporators while at the same time reducing energy costs and making the construction more favorable. The more favorable design results, for example, from the fact that conventional thin film evaporators can be made larger and thus more material can be processed than was previously possible. This increases both the higher water evaporation volume per heating surface and the larger design, i.e. the production capacity per production line.

Also advantageous herein is the increased energy efficiency and process reliability not only for the process step of producing a concentrated pulp suspension in a thin film evaporator, but also in combination with a suitable subsequent process organ, such as preferably a mixing kneader, for the entire transfer of a starting material into a molding solution.

According to the invention, an IL or NMMO is added as a functional liquid for the starting material. The functional liquid serves to dissolve the cellulose under appropriate conditions.

In the method, for example, the transfer mixture may be passed to a subsequent processing organ. The subsequent processing organ may be one of the processing organs already described, such as the mixing kneader or the further thin film evaporator. The subsequent processing organ is intended thereby to further process the transfer mixture into a molding solution. A preferred embodiment of the transfer mixture is thereby selected and practice has shown that the viscosity of the transfer mixture is not only low enough to avoid substantial overheating in the thin film evaporator, but also large enough that the mechanical energy input by friction in the mixing kneader is so high that the need for thermal energy input-supplementing the mechanical energy input—in the mixing kneader is so low that the superstructures of the kneader shaft do not have to serve the thermal heat exchange, but can be designed without heating cavities. This enables a significantly simpler, more favorable and faster design of the kneader shaft.

The transfer mixture is therefore selected to have a water concentration so that at least one of the following conditions is fulfilled or at least one of the following embodiments according to the invention is given:

(1) In the case of a thin film evaporator for reducing the water concentration by evaporation for producing a transfer mixture, the temperature of the heating surface is not substantially lowered, in particular towards the discharge, compared to the feed, and the transfer mixture does not undergo substantial overheating.

(2) In the case of NMMO as a functional liquid, the water content of the transfer mixture generally corresponds to the following conditions:

$$\text{maximum } x_{H2O} = -0.235\, x_{Cell} + 0.235$$

$$\text{minimum } x_{H2O} = -0.59\, x_{Cell} + 0.2047$$

Even more preferably, the transfer mixture is applied at the preferred composition of $$\text{maximum } x_{H2O} = 0.2864\, x_{Cell}^2 - 0.6786\, x_{Cell} + 0.2288$$

$$\text{minimum } x_{H2O} = 0.2864\, x_{Cell}^2 - 0.6786\, x_{Cell} + 0.2188.$$

Preferably, the transfer mixture is selected so that—in addition to (1) and (2) above—it has a water concentration that also applies:

(3) In the case of a mixing kneader as a processing organ directly or indirectly subsequent to the thin film evaporator, the mixing kneader is equipped with at least one kneader shaft, the superstructures of which does not have to be heatable, and the transfer mixture has sufficient viscosity to achieve the evaporation performance required in the mixing kneader for producing a molding solution by means of mechanical energy input, in addition to the thermal energy input via a heatable kneader shaft of the mixing kneader and a heatable housing of the mixing kneader.

The starting material is present as a mixture of cellulose, water and functional liquid, the composition of which can vary greatly.

The starting material thereby becomes a transfer mixture from the feed to the discharge.

In the transfer mixture according to the invention, the cellulose is present partially dissolved and in the case of NMMO as a functional liquid, the water content in the NMMO can be taken from the mathematical formula.

The formulas for describing the transfer mixture refer to the production of a transfer mixture under thermomechanical conditions that allow low-risk operation of the thin film evaporator and have proven themselves in practice. However, due to the explained influences on the dissolution rate of the cellulose, it is possible that the formula predicts a spinnable solution, whereas in practice, despite low water contents, a transfer mixture according to the invention with undissolved cellulosic components is still present, because a special thermomechanical treatment has been chosen, such as very short times of the product between feed and discharge. However, such thermomechanical treatments are at the same time associated with an increased process risk due to substantial overheating and explosive decomposition because of the associated lower water content in the transfer mixture.

Furthermore, according to the invention, this can also mean that the starting material is fed to the thin film evaporator even with compositions within the concentration range which describes the general transfer mixture. Usually, only the process-specific thermomechanical treatment of the starting material in the thin film evaporator (increased temperature and shearing action) results in a transfer mixture characterized by a partial dissolution of the pulp.

The discharge opens into a subsequent processing organ, which is preferably more suitable than the thin film evaporator for the safe transfer of the transfer mixture into a molding solution. Such a subsequent processing organ can herein be a mixing kneader, as described above. The mixing kneader is particularly well suited as a subsequent processing organ thanks to good high-viscosity mixing properties and effective mechanical energy input via the kneader shaft, the speed of which can be quickly adjusted and also quickly reduced again—if necessary down to zero. Another advantage thereby is that the mixing kneader can regulate the temperature with great accuracy and reliability, thus avoiding cooling or heat dissipation as a rule.

In another embodiment, the transfer mixture first passes through a subsequent transfer organ. Then the transfer mixture is passed on to the subsequent processing organ.

Thus, the increased energy efficiency and process reliability applies not only to the process step of producing the transfer mixture, but also, in combination with a suitable subsequent processing unit for the entire transfer of a starting material into a molding solution.

A subsequent processing organ can also be a further thin film evaporator—accepting the above-mentioned disadvantages—wherein the overall design of the thin film evaporator can be adapted to achieve the transfer mixture and the further thin film evaporator can be adapted to the processing of the transfer mixture by its further overall design, such as overall length, angle of its wiper blades or the like. The subsequent processing organ is thereby defined in such a way that the processing organ further processes the transfer mixture into a molding solution. The molding solution can then be used for spinning, for example.

The material properties using the formulas listed above to describe the general transfer range result from the following investigations. The maximum water content $x_{H2O}$ describes the composition which corresponds to the di-hydrate when water and NMMO are considered. NMMO molecules have the ability to form two hydrogen bonds. The hydrogen bonds lead, on the one hand, to the formation of structures with water molecules bonded over them and, on the other hand, to the dissolution of cellulose molecules. From a ratio of less than two water molecules per NMMO molecule, there is theoretically a solubility of the NMMO for cellulose molecules. This separates the transfer mixture from the pure suspension as an upper water content limit. For example, it is also described in the literature that, with appropriate thermomechanical treatment, some cellulose is already in solution at NMMO water concentrations of about 75%.

For the skilled person, the minimum water content $x_{H2O}$ describes, based on U.S. Pat. No. 4,196,282 A, the composition at which complete dissolution of the cellulose in the cellulose-water-NMMO mixture was observed for the first time after visual examination. It thus delimits the transfer mixture from the complete molding solution. The statements made in U.S. Pat. No. 4,196,282 A with respect to NMMO as a functional liquid are confirmed by results and observations from industrial applications and experiments conducted by the inventors on a pilot plant scale. Consequently, the two formulas presented encompass the area of the general transfer mixture.

For a description of the material properties of the preferred transfer range, reference is to be made to the U.S. Pat. No. 4,196,282 A with regard to the minimum water content. Based on this, the curve describes the 95% confidence interval of the minimum water content of the general transfer range and thus further distinguishes itself from the safe state of a complete molding solution. The formula for describing the maximum water content $x_{H2O}$ of the preferred transfer range is based on results from industrial applications of the direct dissolution method and data collected from series of experiments conducted by the inventors on a pilot plant scale. It marks the upper limit of the transfer range within which an optimum utilization of the specific process-relevant thin film evaporator features is ensured.

In the general composition and also in the preferred composition, the transfer mixture is in a pre-solution state. Thus, it has also been achieved that the method for the production of lyocell has been carried out under optimum operating parameters of the thin film evaporator and that the comparatively difficult material states of the lyocell are avoided, for example, when encrustation occurs in the thin film evaporator or overdrying or decomposition takes place. These problematic material states can be relatively easily prevented in the subsequent processing organ, because the subsequent processing organ is generally designed, for example, for higher torques as well as the prevention of encrustation.

In the general composition, a discharge of the transfer mixture is already advantageous because sufficient water has evaporated so that a transfer mixture is formed and further processing to solution in the subsequent process organ can take place in a relatively short process time.

In the preferred composition of the transfer mixture, the maximum amount of water, compared to the definition of the general transfer mixture, is already closer to the complete solution. On the other hand, the minimum amount of water has a greater distance to this complete solution.

In this way, further processing can be realized in a short process time and, at the same time, the risk of overdrying of the material in the thin film evaporator can be further reduced. In both cases, however, the transfer mixture is removed from a moldable or spinnable solution for a process time of several minutes, during which the product is homogenized by mixing and, if necessary, remaining water is evaporated, so that the thin film evaporator can be operated with the preferred operating characteristics described above.

The product and thus also the starting material essentially comprises cellulose, water and a functional liquid. In addition, the product contains further chemicals such as stabilizers, etc., the enumeration of which in detail can be dispensed with in the context of the invention, since they are known to the skilled person and can be adapted for each individual case of application.

Also claimed is a thin film evaporator for processing a starting material into a transfer mixture by the direct dissolution method. Thereby, the thin film evaporator comprises a feed, a housing and a discharge, wherein the feed introduces the starting material or product of substantially cellulose, water and a functional liquid into the housing, whereby an evaporator shaft situated in the housing rotationally wipes the product across the heated interior of the housing, wherein the product heats and some of the water evaporates to form the transfer mixture, wherein, according to the invention, all of the heating surfaces of the thin film evaporator in contact with the product are subjected to a heating temperature, which is at least 20K above the temperature of the product.

In another thin film evaporator according to the invention for processing a starting material into a transfer mixture according to the direct dissolution method having a feed, a housing and a discharge, wherein the feed introduces the product of essentially cellulose, water and N-Methylmorpholine-N-Oxide (NMMO) into the housing wherein an evaporator shaft situated in the housing rotationally wipes the product across the heated interior of the housing, wherein the product heats and some of the water evaporates to form the transfer mixture, wherein upon reaching the transfer mixture composition of $$\text{maximum } x_{H2O} = -0.235\, x_{Cell} + 0.235 \text{ and}$$

$$\text{minimum } x_{H2O} = -0.59\, x_{Cell} + 0.2047$$

the transfer mixture can be passed through the discharge. This means that the thin film evaporator is set in such a way that when the parameters of the transfer mixture are reached, the discharge is automatically or guidedly passed through and further processing or transport is operatively connected to at least one subsequent transfer organ or the transfer mixture is operatively connected to a subsequent processing organ.

An even more preferred composition of the transfer mixture is given when the transfer mixture contains $$\text{maximum } x_{H2O} = 0.2864\,x_{Cell}^2 - 0.6786\,x_{Cell} + 0.2288$$

$$\text{minimum } x_{H2O} = 0.2864\,x_{Cell}^2 - 0.6786\,x_{Cell} + 0.2188.$$

The other embodiments of the method according to the invention also apply to the thin film evaporator, especially when the identical features are designated identically.

BRIEF DESCRIPTION OF THE DRAWINGS

Further advantages, features and details of the invention result from the following description of preferred embodiment and from the drawings; these show in FIG. 1 a diagram showing the preferred material properties of a transfer mixture;

FIG. 2 a diagram showing the general material properties of a transfer mixture.

DETAILED DESCRIPTION

Example 1

The subject of this example is the production of a molding solution with a cellulose content of 12 wt % using the direct dissolution method. The functional liquid used in this example is NMMO. All subsequent proportions refer to the total mass of the cellulose-NMMO-water mixture. A starting material with a cellulose content of approx. 7.2 wt % is prepared from cellulose and aqueous NMMO solution, resulting in an NMMO content of approx. 46.1 wt %. This starting material is introduced into a thin film evaporator where it is concentrated into a transfer mixture. In this example, the thin film evaporator is operated at a process pressure of 70 mbara, so that the equilibrium temperature of the starting material is approx. 43° C. The heating temperature of the thin film evaporator is 130° C. In the present example, the transfer of the mixture takes place within the preferred transfer range at a cellulose content of about 11.5 wt % and an NMMO content of about 73.9 wt %. Under the present process conditions, this corresponds to an equilibrium temperature of the transfer mixture of about 100° C. The ratio of water to NMMO at this point is approximately that of a 1.3 hydrate. The transfer mixture provided by the thin film evaporator is subsequently transferred to a mixing kneader. There, the mixture is finally concentrated by evaporation and homogenized to give a complete molding solution. The molding solution leaves the mixing kneader with a cellulose content of 12.0 wt %, an NMMO content of approx. 77.0 wt %, and a temperature of approx. 107° C.

Example 2

The subject of this example is the production of a molding solution with a cellulose content of 12 wt % using the direct dissolution method. The functional liquid used in this example is an ionic liquid. All subsequent proportions refer to the total mass of the mixture. A starting mixture with a cellulose content of about 8.2 wt % is produced from cellulose and aqueous IL solution, resulting in an IL content of about 58.6 wt %. This starting mixture is introduced into a thin film evaporator where it is concentrated to form a transfer mixture. In the present example, the transfer of the mixture takes place at a cellulose content of about 11.5 wt % and an IL content of about 79.6 wt %. The transfer mixture provided by the thin film evaporator is subsequently transferred to a mixing kneader. There, the mixture is finally concentrated by evaporation and homogenized so that a complete molding solution is obtained. The molding solution leaves the mixing kneader with a cellulose content of 12.0 wt % and an IL content of approx. 83.0 wt %.

FIG. 1 shows a diagram showing the general and the preferred material composition of the transfer mixture. Thereby the general composition a has the following parameters of $$\text{maximum } x_{H2O} = -0.235\,x_{Cell} + 0.235$$

$$\text{minimum } x_{H2O} = -0.59\,x_{Cell} + 0.2047$$

and thus shows a larger margin than the preferred composition b, which has the following parameters of $$\text{maximum } x_{H2O} = 0.2864\,x_{Cell}^2 - 0.6786\,x_{Cell} + 0.2288$$

$$\text{minimum } x_{H2O} = 0.2864\,x_{Cell}^2 - 0.6786\,x_{Cell} + 0.2188.$$

As the water content decreases, the area of solution L is first reached and as the water content continues to decrease, crystallization K of the NMMO occurs.

| Reference list | |
|---|---|
| A | General composition of the tansfer mixture |
| B | Preferred composition of the tansfer mixture |
| K | Crystallization |
| L | Solution |

The invention claimed is:

1. Thin film evaporator (D) for processing a starting material into a transfer mixture according to a direct dissolution method, comprising a feed, a housing and a discharge, wherein the feed introduces the product of essentially cellulose, water and a functional liquid into the housing (4), wherein an evaporator shaft (5) situated in the housing (4) rotationally wipes the product over the heated interior of the housing (4), wherein the product heats and some of the water evaporates to form the transfer mixture, wherein all heating surfaces of the thin film evaporator in contact with the product are subjected to a heating temperature that is at least 20K above the temperature of the product, wherein upon reaching the composition of the transfer mixture of $$\text{maximum } x_{H2O} = 0.2864\,x_{Cell}^2 - 0.6786\,x_{Cell} + 0.2288$$

$$\text{minimum } x_{H2O} = 0.2864\,x_{Cell}^2 - 0.6786\,x_{Cell} + 0.2188$$

the transfer mixture can be passed on through the discharge.

2. Thin film evaporator (D) according to claim 1, wherein the transfer mixture is operatively connected to at least one subsequent transfer organ.

3. Thin film evaporator (D) according to claim 1, wherein the transfer mixture is operatively connected to a subsequent processing organ.

4. Thin film evaporator according to claim 1, further comprising a machine control for monitoring an amount of water, cellulose and functional liquid in the composition of the transfer solution from the feed to the discharge.

5. Thin film evaporator according to claim 4, wherein the machine control system monitors the composition of the product in all states up to the transfer mixture over sensors.

6. Thin film evaporator according to claim 3, wherein the subsequent processing organ is a mixing kneader.

7. Thin film evaporator according to claim 6, wherein the mixing kneader further processes the transfer mixture by water evaporation and stirring into a molding solution according to the direct dissolution method, wherein the kneader shaft structures are designed without heating cavities.

8. Thin film evaporator (D) for processing a starting material into a transfer mixture according to a direct dissolution method, comprising a feed, a housing and a discharge, wherein the feed introduces the product consisting essentially of cellulose, water and N-Methylmorpholine-N-Oxide (NMMO) into the housing (4), wherein an evaporator shaft (5) situated in the housing (4) rotationally wipes the product over the heated interior of the housing (4), wherein the product heats and some of the water evaporates to form the transfer mixture, wherein upon reaching the composition of the transfer mixture of $$\text{maximum } x_{H2O} = 0.2864\, x_{Cell}^2 - 0.6786\, x_{Cell} + 0.2288$$

$$\text{minimum } x_{H2O} = 0.2864\, x_{Cell}^2 - 0.6786\, x_{Cell} + 0.2188.$$

the transfer mixture can be passed on through the discharge.

* * * * *